United States Patent [19]

Gowan, Jr.

[11] Patent Number: 4,963,625
[45] Date of Patent: Oct. 16, 1990

[54] POLYACRYLAMIDE WHITENER OF HIGH BRIGHTNESS AND RETENTION CHARACTERISTICS AND LOW TOXICITY AND METHOD OF INCREASING PAPER WHITENESS

[75] Inventor: John W. Gowan, Jr., Washington, D.C.

[73] Assignee: Westvaco Corporation, New York, N.Y.

[21] Appl. No.: 401,624

[22] Filed: Aug. 31, 1989

[51] Int. Cl.$^5$ ............................................. C08F 8/32
[52] U.S. Cl. ............................. 525/329.9; 525/379; 525/381; 525/382
[58] Field of Search ............................ 525/329.9

[56] References Cited

U.S. PATENT DOCUMENTS

| | | |
|---|---|---|
| Re. 28,541 | 9/1975 | Ryan . |
| 3,821,282 | 6/1974 | Blahak et al. . |
| 3,912,697 | 10/1975 | Pacifici . |
| 3,933,675 | 1/1976 | Willett . |
| 3,943,150 | 3/1976 | Kashikina et al. . |
| 4,273,873 | 6/1981 | Sugitachi et al. . |
| 4,474,916 | 10/1984 | Streit et al. ............ 525/329.9 |
| 4,501,767 | 2/1985 | Iimure . |

FOREIGN PATENT DOCUMENTS 1696165 11/1971 Fed. Rep. of Germany .
1142504 2/1969 United Kingdom .

Primary Examiner—Bernard Lipman

[57] ABSTRACT

A polyacrylamide of high brightness and retention characteristics and low biological toxicity comprises a polyacrylic acid having covalently bound thereto at least one residue of a compound of the formula

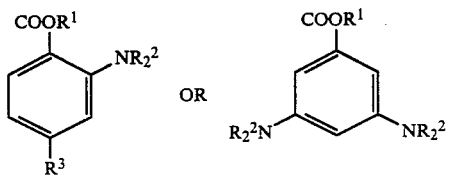

wherein
$R^1$ is H, ($C_1$–$C_6$)alkyl, ($C_2$–$C_6$)alkenyl, ($C_2$–$C_6$)alkynyl or ($C_1$–$C_6$)alkoxyl;
$R^2$ is H, ($C_1$–$C_6$)alkyl, ($C_2$–$C_6$)alkenyl, ($C_2$–$C_6$)alkynyl or ($C_1$–$C_6$)alkoxyl; and
$R^3$ is H or $NR_{n'}$ wherein n is 2 or 3; wherein if n=3 the compound further comprises $X^-$, wherein $X^-$ is an anion.

A paper whitening composition comprises a whitening amount of the above amide polymer.

A cellulosic product of high brightness and retention characteristics and low biological toxicity comprising the polyacrylamide of this invention. A food product is packaged with the above cellulosic product.

A method of increasing the fluorescent brightness and retention characteristics while lowering the biological toxicity of the fluorescent compound shown above comprises covalently binding at least one residue of the fluorescent compound to a polymer resulting in a polyacrylamide. A method of increasing the brightness and retention characteristics of a cellulosic product while preserving its low biological toxicity comprises covalently binding to a polyacrylic acid polymer at least one residue of the above compound to form a polyacrylamide, and adding a whitening amount of the amide polymer to cellulosic ingredients to form a whitened product. A method of increasing the whiteness of a cellulosic product and its retention characteristics while preserving its low biological toxicity comprises coating the cellulosic product with a whitening amount of a polyacrylamide having bound thereto at least one residue of the above fluorescent compound.

10 Claims, No Drawings

POLYACRYLAMIDE WHITENER OF HIGH BRIGHTNESS AND RETENTION CHARACTERISTICS AND LOW TOXICITY AND METHOD OF INCREASING PAPER WHITENESS

Background of Invention

This invention is related to copending U.S. application Ser. No. 07/347,328, filed on May 4, 1989, entitled "Preparation of Polymers with Pendant organic Moieties Bound thereto via Ester and/or Amide Bridges", U.S. application Ser. No. 426,866, filed on Oct. 26, 1989, entitled "Cellulosic Pulp of High Brightness and Retention Characteristics and Methods of Preparing thereof", U.S. application Ser. No. 401,427, filed on Aug. 31, 1989, entitled "Polyalkylene Imide of High Brightness and Retention and Low Toxicity and Method of Increasing Paper Whiteness", U.S. application Ser. No. 462,231, filed on Jan. 9, 1990, entitled "Quaternary Ammonium Fluorescent Whitening Agents, Products thereof, Method of Preparing the Agent and Method of Using thereof", and U.S. application Ser. No. 07/347,200, filed on May 4, 1989, entitled "Fluorescent Whitening Agents, Products Comprising the Agents and Method of Use Thereof", by the present inventors and assignor.

This invention relates to the covalent binding of fluorescent brightners to polyacrylic acid materials. More particularly, this invention relates to the covalent binding of anthranilic acid and derivatives thereof to polyacrylic acid and derivatives thereof. The thus obtained covalently bound polyamide derivatives are suitable for use as whiteners in the manufacture of paper products. These products show high brightness characteristics. In addition, the whiteners evidence substantially no migration out of the products and extremely low biological toxicities. Accordingly, the present polyacrylic acid polymers are suitable for packaging of foodstuffs.

The successful use of fluorescent brightners on sheets has up to this time relied on the addition of cationic groups to fluorescent molecules, or the utilization of alum sensitive molecules, starch-based fluorescent molecules or polymer-bound fluorescent molecules. (Mehlretter, C. L., *I.&E.C. Prod. Res.* 8:77–79 (1969): GB Patent No. 1,142,504; DE Patent No 1,696,165). However, no prior product conveyed to the substrate high fluorescence characteristics as well as excellent retention of the high brightness characteristics, i.e., the fluorescent brightener itself.

U.S. Pat. No. 3,912,697 to Eastman Kodak Co. discloses light sensitive polymers and their use in photographic reproduction. The polymers which form the backbone of the light sensitive polymers include hydroxyl-containing polymers such as cellulose and its partially esterified or etherified derivatives or anthranilic acid polymers such as polyvinyl anthranilate. However, no covalently bound anthranilic acid-cellulose derivatives are mentioned therein.

U.S. Pat. No. 4,273,873 to UNITKA LTD. of Japan discloses and claims a process for preparing an antithrombogenic polymeric material by reacting various compounds including antithrombogenic products, polymeric material such as cellulose or cellulose acetate and an anthranilic acid derivative to cause the various reactants to covalently or ionically bind to the polymeric material. However, the prior art patent does not disclose a product where anthranilic acid or a derivative thereof is covalently bound to a cellulose-type polymer. Moreover, the prior art polymer contains a synthetic fibrinolytic compound and a fibrinolytic enzyme, and is intended as antithrombogenic materials. The specific anthranilic acid derivatives suitable for use in the prior art invention are described in columns 3 and 6 of the patent.

U.S. Pat. No. 3,821,282 describes polymerizable anthranilic acid esters obtained by heating acrylic or methacrylic acid esters with isatoic anhydride. The resulting polymers are polymerizable esters as described for example in claim 1 of this patent. The patent contains no suggestion of the monoester polymers being useful as fluorescent brightening agents.

U.S. Pat. No 4,501,767 discloses a method for forming multi-coats and discloses reaction products of acrylic compounds and aminobenzoic acids in the preparation of an accelerator. There is mentioned the reaction product of ortho-, meta- or para-aminobenzoic acid with a polymerizable unsaturated carboxylic acid or a polymerizable unsaturated alcohol No products resulting from this reaction are described as such in the patent. Moreover, there is no suggestion of utility of the reaction product as a fluorescent brightener.

U.S. Pat. No. 3,933,675 to Willett discloses improved curing agents having long pot life for use with urethane elastomers. These agents are prepared by reacting in an acid medium orthochloroaniline, an ester of anthranilic acid and formaldehyde in selected molar ratios.

Re. 28,541 discloses diamine cured polyurethane compositions with unusually long pot life which cure rapidly at elevated temperatures. The compositions are prepared by combining a prepolymer of di- or polyisocyanate and hydroxy-terminated polyether or polyester of molecular weights 150–3,000 daltons.

U.S. Pat. No. 3,943,150 to Kashkina et al discloses a salt of beta-diethyl aminoethyl ester of p-aminobenzoic acid with the acetal of polyvinyl alcohol and glyoxylic acid. The patent also provides a method of preparing the compound comprising reacting the acetal of polyvinyl alcohol and glyoxylic acid with beta-diethylaminoacetyl ester of p-aminobenzoic acid in an aqueous medium and isolating the desired product from the resulting solution.

Accordingly, there is still a need for improving the brightness characteristics of cellulosic products while at the same time improving their brightness retention and preserving their low toxicity

Summary of Invention

This invention related to a polyacrylamide of high brightness and retention characteristics and low biological toxicity, comprising a polyacrylic acid having covalently bound thereto at least one and up to about 1000 residues of a compound of the formula

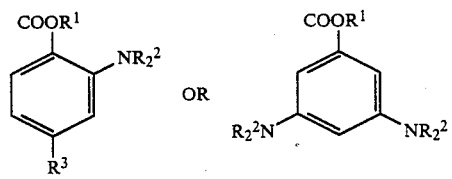

wherein $R^1$ is H, $(C_1-C_6)$alkyl, $(C_2-C_6)$alkenyl, $(C_2-C_6)$alkynyl or $(C_1-C_6)$alkoxyl;

$R^2$ is H, $(C_1-C_6)$alkyl, $(C_2-C_6)$alkenyl, $(C_2-C_6)$alkynyl or $(C_1-C_6)$alkoxyl; and $R^3$ is H or $NR_n$, wherein n is 2 or 3; wherein if n=3 the compound further comprises $X^-$, wherein $X^-$ is an anion.

This invention also relates to a paper whitening composition, comprising a whitening amount of the polyacrylamide of this invention having high brightness and retention and low biological toxicity.

Preferred amounts are about 0.01 to 99.99 wt %, more preferably about 1 to 99 wt %, still more preferably about 10 to 90 wt %, and still more preferably about 25 to 75 wt % of the polyacrylamide of the invention. Other ingredients known in the art of whitening compositions may further be added thereto as well. Typically, other whiteners, preservatives, and the like may be added in amounts known in the art.

Also part of this invention is a cellulosic product of high brightness and retention characteristics and low biological toxicity which comprises the polyacrylic acid amide described above. Typically, the whitener may be added to the paper ingredients and/or it my be coated onto the paper as is known in the art.

This invention also relates to a food product packaged with a cellulosic product whitened with the polyacrylamide of this invention.

A method is disclosed herein for increasing the brightness and retention characteristics of a cellulosic pulp while preserving its low biological toxicity comprising adding thereto a whitening amount of the polyacrylamide of this invention.

Also provided herein is a method of increasing the whiteness and retention characteristics of a cellulosic product while preserving its low biological toxicity, comprising adding to the cellulosic ingredients a whitening amount of a polyacrylamide having covalently bound thereto at least one residue of the compound of the formula

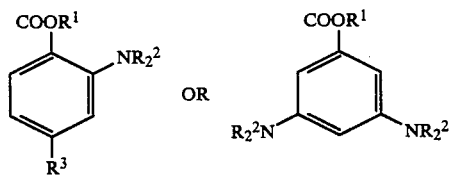

wherein $R^1$ is H, $(C_1-C_6)$alkyl, $C_2-C_6)$alkenyl, $(C_2-C_6)$alkynyl or $(C_1-C_6)$alkoxyl:

$R^2$ is H, $(C_1-C_6)$alkyl, $C_2-C_6)$alkenyl, $(C_2-C_6)$alkynyl or $(C_1-C_6)$alkoxyl; and $R^3$ is H or $NR_n$, wherein n is 2 or 3; wherein if n=3 the compound further comprises $X^-$, wherein $X^-$ is an anion; and forming said cellulosic product.

A method is also provided for increasing the brightness and retention characteristics of a cellulosic product while preserving its low biological toxicity, comprising adding to the cellulosic ingredients a whitening amount of a polyacrylamide having covalently bound thereto at least one and up to 1000 residues of the compound of the formula

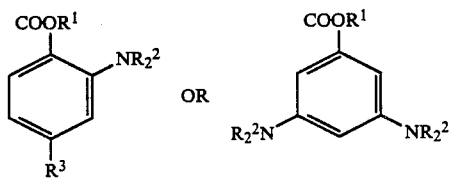

wherein $R^1$ is H, $(C_1-C_6)$alkyl, $(C_2-C_6)$alkenyl, $(C_6)$alkynyl or $C_1-C_6)$alkoxyl;

$R^2$ is H, $(C_2-C_6)$alkyl, $(C_1-C_6)$alkenyl, $(C_2-C_6)$alkynyl or $(C_1-C_6)$alkoxyl; and $R^3$ is H or $NR_n$, wherein n is 2 or 3: wherein if n=3 the compound further comprises $X^-$, wherein $X^-$ is an anion; and forming said cellulosic product.

A method is also provided for increasing the brightness and retention characteristics of a cellulosic product while preserving its low biological toxicity, which comprises coating a cellulosic product with a whitening amount of a polyacrylamide having covalently bound thereto at least one and up to about 1000 residues of a compound of the formula

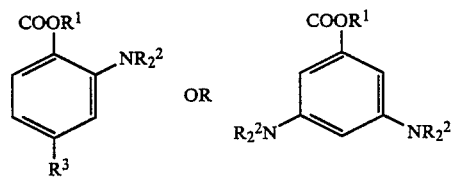

wherein $R^1$ is H, $(C_1-C_6)$alkyl, $(C_2-C_6)$alkenyl, $(C_1-C_6)$alkynyl or $(C_1-C_6)$alkoxyl;

$R^2$ is H, $(C_1-C_6)$alkyl, $(C_2-C_6)$alkenyl, $(C_2-C_6)$alkynyl or $(C_1-C_6$alkoxyl; and $R^3$ is H or $NR_n$, wherein n is 2 or 3; wherein if n=3 the compound further comprises $X^-$, wherein $X^-$ is an anion.

Other objects, advantages and features of the present invention will become apparent to those skilled in the art from the following discussion.

Detailed Description

This invention results from a desire to improve on prior art technology intended for increasing the brightness of cellulosic products as well as their retention characteristics. In addition the present invention further decreases the low biological toxicity of the fluorescent compounds utilized in the formation of the present whitening agents by building them into large polymeric structures.

In the present invention, a fluorescent material, i.e., an anthranilic acid or derivative thereof, is covalently attached to a polyacrylic acid by means of an amide bond and then either incorporated into pulp fibers which are subsequently utilized in the manufacture of paper products or coated onto a finished cellulosic product.

The higher the level of addition of the fluorescent compound to the polyacrylamide polymer the higher the brightness achieved by covalently binding the two and forming amide bonds. This covalent binding also decreases the migration capacity of the fluorescent material in the cellulosic product, even under harsh conditions. The products provided herein are accordingly high in brightness characteristics and low in brightness leaching characteristics as well as low biological toxicities.

A polyacrylamide whitener of high brightness and retention and low biological toxicity is provided herein, which comprises
an acrylamide polymer having covalently bound thereto at least one and up to about 1000 residues of a compound of the formula

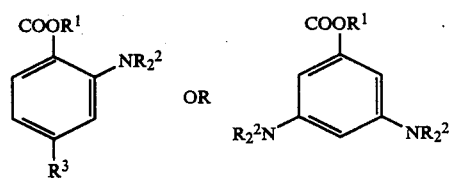

wherein
R$^1$ is H, (C$_1$-C$_6$alkyl, (C$_1$-C$_6$(C$_2$-C$_6$)alkynyl or (C$_1$-C$_6$)alkoxyl;
R$^2$ is H, (C$_1$-C$_6$-C$_6$)alkyl, (C$_1$-C$_6$alkenyl, (C$_2$-C$_6$-)alkynyl or (C$_1$-C$_6$)alkoxyl; and
R$^3$ is H or NR$_n$, wherein n is 2 or 3; wherein if n=3 the compound further comprises X$^-$, wherein X$^-$ is an anion.

The polyacrylamide whitener of the invention may, in addition to the polyacrylic acid amide polymer, comprise other ingredients. Suitable ingredients are other whiteners such as 4,4'-diaminostilbene-2,2'-disulphonic acid derivatives, among others, which are known in the art. Examples of other ingredients and/or additives are dispersants, surfactants, solvents, and buffers. However, other additives and/or ingredients may also be incorporated into the polyacrylamide whitener of the invention in amounts which will be known by an artisan.

The polyacrylamide whitener of the invention may suitably have a backbone of polyacrylic acid, (C$_1$-C$_8$alkyl derivatives thereof, co-polymers thereof with (C$_2$-C$_8$)alkylenes, styrene, amethylstyrene and derivatives thereof capable of forming a covalent bond with the above compound. More specifically, any of the above polymers may contain further reactive groups which are capable of reacting with the anthranilic acid derivatives to form a covalent bond. Typical reactive groups are alcohol, amine, ester and anhydride. However, other reactive groups may also be incorporated thereto.

Preferred polyacrylamide whitners are polyacrylamide and polymethacrylamide. Still more preferred is polyacrylamide. Preferred copolymers are styrene, amethylstyrene and (C$_2$-C$_8$) alkylenes.

Suitable polymers are linear or branched polymers, and optionally cross-linked polymers. The polymers typically will have an average molecular weight of about 1000 to 100,000 daltons, and more preferably about 10,000 to 20,000 daltons. However, any polymer suitable for the preparation of a paper-like product may be utilized within the confines of this invention.

In the case where the anthranilic acid derivative is a quaternary ammonium salt, it is accompanied by an anion. Suitable anions are known in the art but some examples are halides, nitrates, phosphates, and sulfates. However, other anions may also be utilized.

The proportion of residues of the compound which are covalently bound to the acrylic acid polymer may vary significantly. In fact, any number of residues may be covalently bound to the polymer. Clearly, at least one residue is necessary and up to about 1000 residues of the compound may also be incorporated per molecule of polymer. Preferred are about 50 to 1000 residues, and still more preferred are about 50 to 1000 residues per molecule of polymer. This number may clearly vary depending on the average molecular weight and other characteristics of the polymer, such as the number of reactive moieties present therein. In fact, the upper limit for the number of residues which may be covalently bound to the polymer is given by the number of reactive groups present in the polymer.

In a preferred embodiment of the invention, the compound is selected from the group consisting of

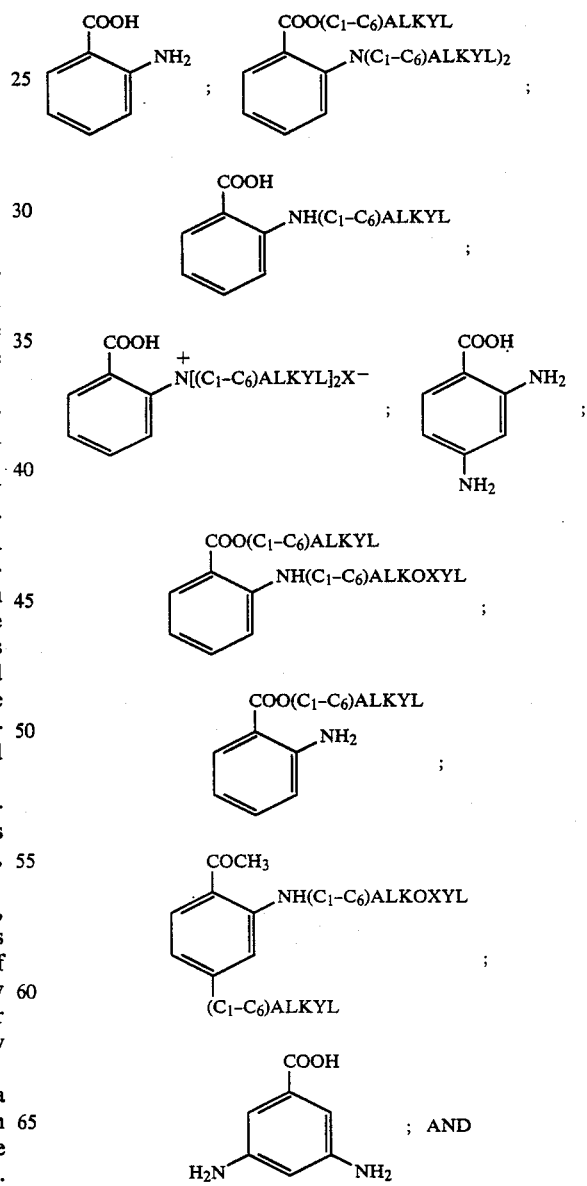

-continued

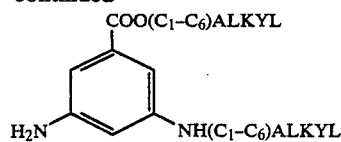

Another preferred embodiment of the acrylamide polymer is that where the compound is selected from the group consisting of

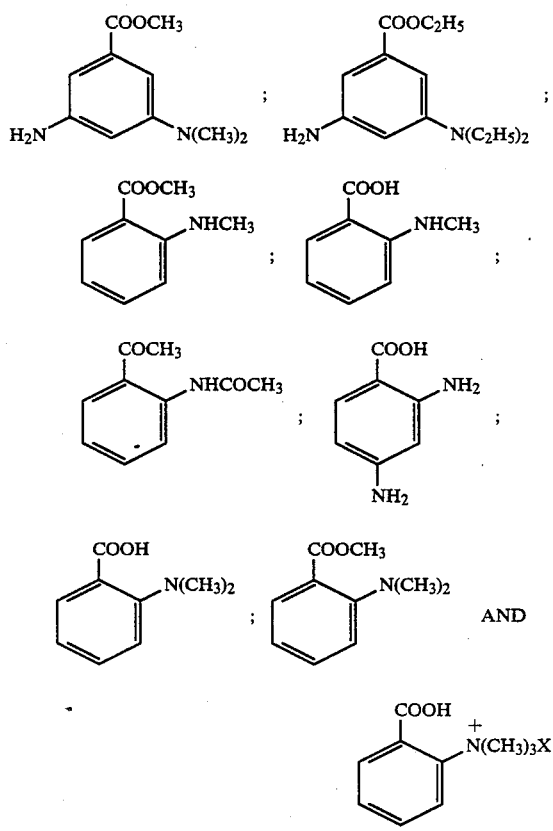

In a most preferred embodiment, the compound is anthranilic acid.

A most preferred embodiment of the present invention is that where the polyacrylamide whitener consists essentially of the polyacrylamide whitening compound.

Another preferred embodiment is that where the polymer further comprises a linker which is covalently bonded to both the polymer and the compound. Suitable linkers are known in the art as well as methods for covalently binding them to the polymer and the reactive groups of compounds such as anthranilic acid and derivatives thereof. Suitable linkers are epichlorohydrine and 3-chloro-1-propanol.

However, other linkers may also be utilized within the confines of this invention.

Also part of this invention is a paper whitening composition comprising a whitening amount of a polyacrylamide comprising a polyacrylic acid having covalently bound thereto at least one and up to about 1000 residues of a compound of the formula

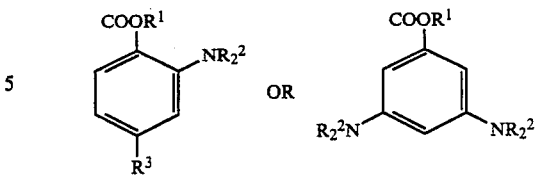

wherein $R^1$ is H, $(C_1-C_6)$alkyl, $(C_2-C_6)$alkenyl, $(C_2-C_6)$alkynyl or $(C_1-C_6)$alkoxyl;

$R^2$ is H, $(C_1-C_6)$alkyl, $(C_1-C_6$alkenyl, $(C_2-C_6)$alkynyl or $(C_1-C_6)$alkoxyl; and $R^3$ is H or $NR_n$, wherein n is 2 or 3; wherein if n=3 the compound further comprises $X^-$, wherein $X^-$ is an Preferred amounts are about 0.01 to 99.99 wt %, more preferably about 1 to 99 wt %, still more preferably about 10 to 90 wt %, and still more preferably about 25 to 75 wt % of the amide of the invention. Other ingredients known in the art of whitening compositions may be further added thereto in amounts also known. Typically other whiteners, preservatives, and the like may be added.

Preferably, the polyacrylamide and/or the above composition are added in an amount of about 0.0001 to 1 wt % of the amide to the cellulosic ingredients, and more preferably about 0.01 to 0.1 wt % of the ingredients. When coated onto a finished cellulosic product the composition may be sprayed, roll coated, or dipped, among other methods. Typically, it will be coated in an amount of about 0.01 to 0.1 wt % of the cellulosic product. The composition may be in solid, liquid or aerosol form. Carriers for these are known in the art. The coating methods are standard in the art and need not be further described herein.

Also provided herein is a cellulosic product of high brightness and retention characteristics and low biological toxicity which comprises the polyalkylene imide of this invention. Examples of cellulosic products are sheets of paper, board, pulp and fillers, for various uses.

The cellulosic product may typically comprise cellulose ingredients such as in the form of cellulosic pulp and a whitening amount of the polyalkylene imide of this invention. In one preferred embodiment, the acrylic acid may be co-polymerized with cellulose by methods known in the art and the fluorescent compound then bound thereto.

Methods for undertaking the preparation of the whiteners of this invention are known in the art and can suitably be modified by an artisan for utilization in the synthesis of the present polyacrylamide whitener.

Also provided herein is a food product packaged with the whitened cellulosic product disclosed herein. The present products are particularly suited for use in the food industry since anthranilic acid and its derivatives are known to have substantially no biological toxicity. Their buildup to large polymers further decreases this low toxicity. Typically, the food products may be dry or moist.

Another method is also provided herein for increasing the brightness and retention characteristics of a cellulosic product while preserving its biological toxicity, which comprises coating a cellulosic product with a whitening amount of a polyacrylamide having covalently bound thereto at least one and up to about 1000 residues of a compound of the formula

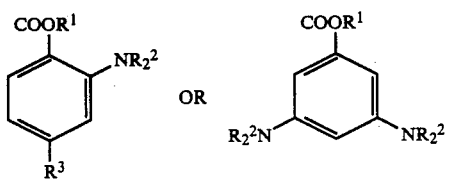

wherein
$R^1$ is H, $(C_1-C_6)$alkyl, $(C_2-C_6)$alkenyl, $(C_2-C_6)$alkynyl or $(C_1-C_6)$alkoxyl;
$R^2$ is H, $(C_1-C_6)$alkyl, $(C_2-C_6)$alkenyl, $C_1-C_6)$alkynyl or $(C_1-C_6)$alkoxyl; and
$R^3$ is H or $NR_n$, wherein n is 2 or 3; wherein if n=3 the compound further comprises $X^-$, wherein $X^-$ is an anion.

Another method provided herein is one for increasing the brightness and retention characteristics while lowering the biological toxicity of a compound of the formula

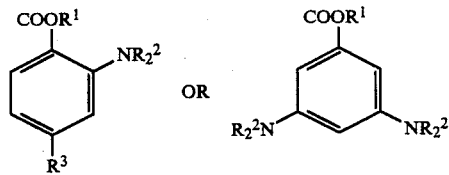

wherein $R^1$ is H, $(C_1-C_6)$alkyl, $(C_1-C_6)$alkenyl, $(C_2-C_6)$alkynyl or $(C_1-C_6)$alkoxyl:
$R^2$ is H, $(C_1-C_6)$alkyl, $(C_2-C_6)$alkenyl, $(C_2-C_6)$alkynyl or $(C_1-C_6)$alkoxyl; and
$R^3$ is H or $NR_n$, wherein n is 2 or 3; wherein if n=3 the compound further comprises $X^-$, wherein $X^-$ is an anion, said method comprising
covalently binding at least one and up to about 1000 residues of said compound to a polyacrylic acid via an amide bond.

The polyacrylamide whitener of this invention can be prepared by methods known in the art.

Typically, they may be prepared by a method which comprises contacting the compound disclosed hereinabove with a polyacrylic acid in an amount preferably about 10:1 to 1:1 molar equivalents, and more preferably about 7:1 to 5:1 molar equivalents, under conditions effective to form an amide thereof, and separating the amide from the reaction mixture.

In a preferred embodiment the present polyacrylamide whiteners are prepared in an acidic medium at reflux, typically at temperatures of about 50° to 150° C. Examples of the acid are p-toluene sulfonic acid and the like. The present method may be conducted by reacting the compound with the polyacrylic acid in an amount of about 10:1 to 1:1 molar equivalents under conditions effective to form an amide thereof, and free water separating said amide from the reactants, and by further adding the whitener to paper pulp ingredients. Methods of preparing cellulosic pulp are known in the art as are methods for whitening paper pulp. The cellulosic pulp may contain other polymers either as co-polymers or mixed thereto.

In a particularly preferred embodiment of the invention, the compound is reacted with the polyacrylic acid in amounts of about 10:1 to 1:1 molar equivalents at a temperature of about 80° to 110° C., and optionally in the presence of a solvent such as an organic solvent, e.g., toluene, benzene, and xylene, mixtures thereof or mixtures with other solvents. The separation of the amide polymer from the reactants may be conducted by the same methods described above.

Typically, the solvent is an organic solvent and the separation of the amide polymer from the water is conducted by filtration. Further steps of washing and drying may be conducted and the polymer may then be stored.

Also provided is a method of increasing the brightness and retention characteristics of a cellulosic pulp while preserving its low biological toxicity which comprises adding to the pulp a whitening amount of a polyacrylamide having bound thereto at least one and up to about 1000 residues of a compound as described above. Preferred amounts added are those described above.

The whitening composition comprising, the polyacrylamide whitener of the invention may further comprise other ingredients and/or additives such as whiteners and the like which are known in the art and are added in amounts also known in the art.

This invention also encompasses a method of increasing the brightness and retention characteristics of a cellulosic product while preserving its low biological toxicity, which comprises
coating onto the cellulosic product a whitening amount of the polyacrylamide whitener of the invention.

The conditions for practicing this method are known in the art. The whitener may be coated by spraying, dipping, roll coating and the like.

In a preferred embodiment of the above methods the cellulosic product may be further printed and utilized for wrapping and/or packaging, such as when applied to the wrapping and/or packaging of a food product.

A food product is also part of this invention. This product is packaged with the whitened cellulosic product of the invention. Typical food products are moist and dry food products.

In a preferred embodiment of this invetion the present polyacrylic acid amide whiteners are prepared in a acidic medium at reflux, typically at temperatures of about 50° to 150° C., and more preferably about 80° to 110° C. Examples of the acid are p-toluene sulfonic acid and the like.

Having now generally described this invention, the same will be better understood by reference to certain specific examples, which are included herein for purposes of illustration only and are not intened to be limiting of the invention or any embodiment thereof, unless so specified.

EXAMPLE 1

Preparation of Polyacrylic Acid Anthranilic Amide 5 g of polyacrylamide average molecular weight 50,000 daltons, and 1 g of anthranilic acid are allowed to react at reflux for about 12 hrs in 250 ml toluene in the presence of 0.1 p-toluene sulfonic acid. The resultant polyacrylic acid-anthranilic amide is washed to remove unreacted anthranilic acid and solvent.

The thus obtained polyamide is then incorporated along with cellulosic pulp into a hand sheet and its fluorescence is determined.

EXAMPLE 2

Demonstration of High Fluorescence and Retention of the Acrylic Acid-Anthranilic Amide Polymer of the Invention The derivatized polyacrylamide obtained in Example 1 is formed with cellulosic pulp into a hand sheet and is determined to be fluorescent prior to being subjected to any treatment.

Hand sheets produced by the method of Example 1 are subjected to caustic treatment with 0.1 N NaOH for 24 hours.

In addition, hand sheets prepared by the process of Example 1 are also subjected to solvent extraction with methanol.

After each hand sheet is subjected to the two treatments described above, they are all allowed to dry and are then tested for fluorescence.

All the sheets kept at least 50% of the original fluorescence. It can be said that the polyacrylamide derivatives produced in accordance with the present invention are stable to caustic treatment and to solvent extraction.

EXAMPLE 3

Paper Product Coated with a Polyacrylamide of the Invention

Portions of various filter paper sheets are dipped in an aqueous solution containing 1 wt % acrylic acidanthranilic amide and dried.

The filter papers are then washed with 250 ml of water and dried.

Substantially no fluorescence is observed to have migrated from the section containing the polyacrylamide off the dipped areas into the non-dipped areas.

It thus can be said that the present amides have a high retention capability when applied to cellulosic products.

The invention now being fully described, it will be apparent to one of ordinary skill in the art that many changes and modifications can be made thereto without departing from the spirit or scope of the invention as set forth herein.

What is claimed is:

1. A polyacrylic acid amide of high brightness and retention characteristics and low biological toxicity, comprising
    a polyacrylic acid having covalently bound thereto through an amide bond at least one residue and up to the total number of binding groups present in the polymer of a compound of the formula

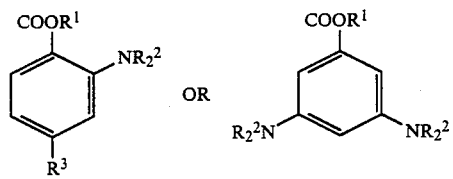

wherein
$R^1$ is H, $(C_1-C_6)$alkyl, $(C_2-C_6)$alkenyl, $(C_2-C_6)$alkynyl or $(C_1-C_6)$alkoxyl;
$R^2$ is H, $(C_1-C_6)$alkyl, $(C_2-C_6)$alkenyl, $(C_2-C_6)$alkynyl or $(C_1-C_6)$alkoxyl; and
$R^3$ is H or $NR_n$, wherein n is 2 or 3; wherein if n=3 the compound further comprises $X^-$, wherein $X^-$ is an anion.

2. The polyacrylic acid amide of claim 1 having an average molecular weight of about 1,000 to 100,000 daltons.

3. The polyacrylic acid amide of claim 1, wherein the polyacrylic acid is selected from the group consisting of polyacrylic acid, $(C_1-C_6)$alkyl derivatives thereof, co-polymers thereof with styrene, αmethylstyrene, $(C_2-C_8)$ alkylenes and derivatives thereof capable of forming a covalent amide bond with the above compound.

4. The polyacrylic acid amide of claim 1, wherein the compound is selected from the group consisting of

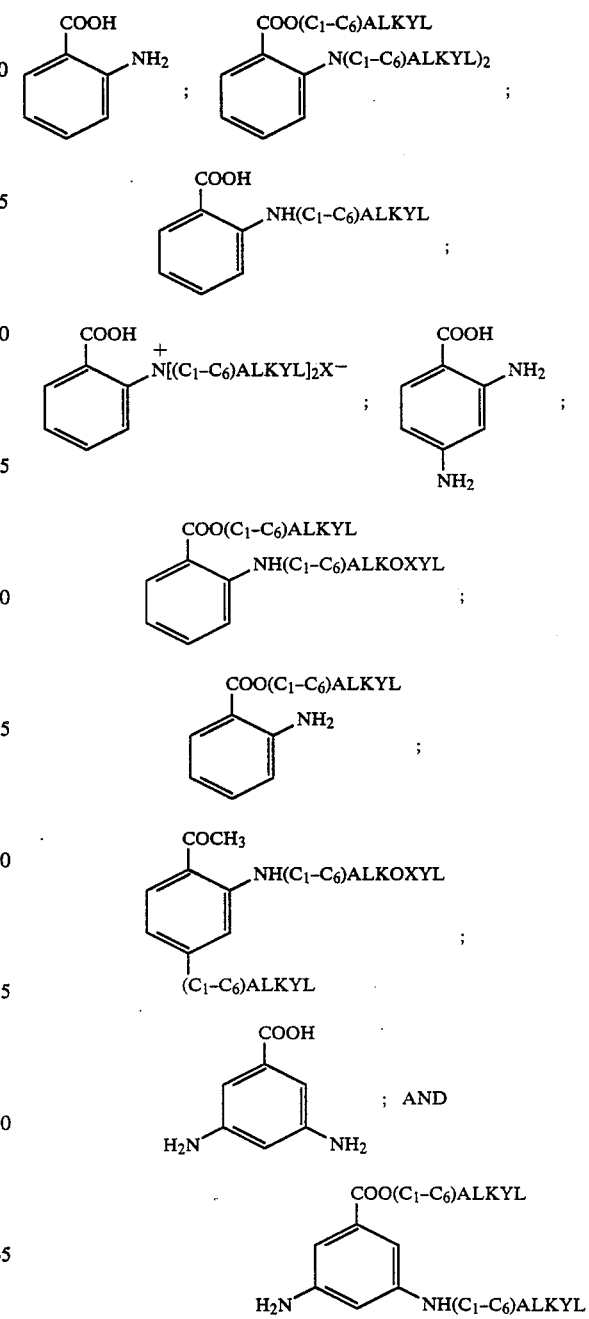

5. The polyacrylic acid amide of claim 4, wherein the compound is selected from the group consisting of

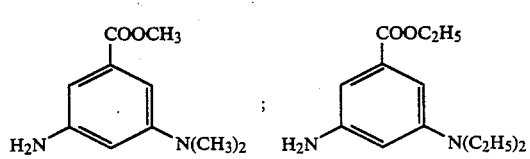

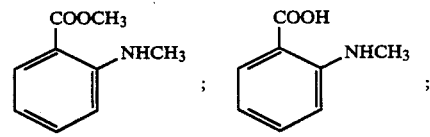

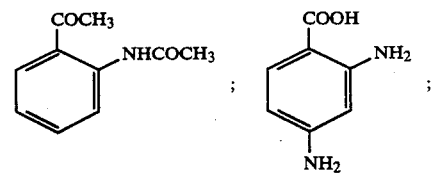

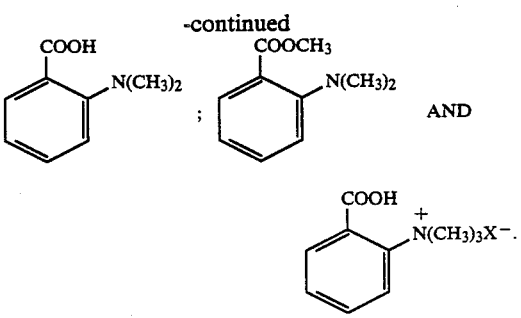

6. The polyacrylic acid amide of claim 5, wherein the compound is anthranilic acid.

7. The polyacrylic acid amide of claim 1, further comprising
a linker which is covalently bound to the polyacrylic acid through an oxygen atom and to the compound through a nitrogen atom.

8. The polyacrylic acid amide of claim 1, wherein the polyacrylic acid has covalently bound thereto at least one and up to about 1000 residues of the compound per molecule.

9. The polyacrylic acid amide claim 1, consisting essentially of the polyacrylic acid having the compound covalently bound thereto.

10. A paper whitening composition, comprising a whitening amount of the polyacrylic acid amide of claim 1.

* * * * *